United States Patent [19]
Blount

[11] Patent Number: 5,721,281
[45] Date of Patent: Feb. 24, 1998

[54] FLAME RETARDANT POROUS PLASTICS

[76] Inventor: David H. Blount, 6728 Del Cerro Blvd., San Diego, Calif. 92120

[21] Appl. No.: 674,089

[22] Filed: Jul. 1, 1996

[51] Int. Cl.$^6$ .................................................. C08J 9/00
[52] U.S. Cl. ........................ 521/50; 523/84.1; 523/85; 523/89; 523/103; 523/106; 523/107; 523/109.1; 523/120; 523/121; 523/142; 523/150; 523/155
[58] Field of Search ............................ 521/155, 50, 84.1, 521/85, 89, 103, 106, 107, 109.1, 120, 121, 142, 150

[56] References Cited

U.S. PATENT DOCUMENTS 4,346,180  8/1982  Blount .................................. 521/100
4,795,763  1/1989  Gluck et al. .

*Primary Examiner*—John M. Cooney, Jr.

[57] ABSTRACT

Opened-celled porous plastics or natural products are made flame retardant by coating the cell walls with a liquid containing carbonization auxiliaries and/or flame retardant agents. The excess liquid is removed and the mass is dried. The open-celled porous mass now has good fire characteristics. The carbonization auxiliaries and/or flame retardant agents may also be used in the production of the open-celled porous organic masses. These flame retardant porous masses may be used in furniture, mattresses, fire barriers, textile coating, laminates, linings and as insulators.

13 Claims, No Drawings

FLAME RETARDANT POROUS PLASTICS

BACKGROUND OF THE INVENTION

The present invention relates to flame retardant open-celled porous plastics and natural products. The open-celled porous plastic products are made to be flame retardant by coating the cell wall with a flame retardant mixture of compounds containing phosphorus and/or boron, carbonization auxiliaries, auxiliary agents, fillers, and/or halogenated compounds. The flame retardant compounds maybe reacted with the plastic components, such as isocyanate-reactive compounds, polyepoxides, polyol, polyamines, and others then after the open-celled porous mass has been produced the open cells are coated with a liquid solution and/or emulsion of the flame retardant mixture. The excess liquid is then removed and the mass is dried. The flame retardants are left on the cell walls and/or in the cells.

The flame retardant open-celled porous plastic and natural products that are made flame retardant by coating the cell wall with flame retardant mixtures according to this invention are distinguished by having surprising good fire chacteristics in spite of being prepared without the use of flame retardant compounds in the production of the porous mass. There is some improvement in the good fire chacteristics of the cellular coated porous mass with the addition of flame retardant compounds utilized in the production of the porous masses.

There is a problem with organic open-celled porous masses because they are highly flammable, especially the flexible open-celled polyurethane foams, and they are the most difficult to make flame retardant. This problem is surprisingly solved by the process of this invention. This is achieved by coating the open cells with a flame retardant compound mixture even without adding flame retardant compounds in the production of the porous masses. When the treated porous masses are exposed to flames, a char and/or intumescent masses are produced. The char and/or intumescent mass stops the burning of the porous mass.

The open-celled polyurethane foams are the preferred porous mass to be flame retarded by the process of this invention. The open-celled flexible masses are the easiest to flame retard because they can be compressed before they are placed in the liquid containing the flame retardant compounds then decompressed while in the liquid therefore the flame retardants are vacuumed into the cells. The excess liquid then can be removed from the porous mass by compressing the mass. The rigid type open-celled porous must be left in the liquid until the liquid replaces the air in the cells. It is preferred that the flame retardants are carbonization agents.

The flame retardant open-celled porous masses may be used for insulation, for fireproofing, as cushioning, for sound proofing, and other uses commonly known in the polyurethane Art. The primary purpose of this invention is to produce flame retardant open-celled porous masses. Another object of this invention is to flame retard existing open-celled porous masses.

SUMMARY OF THE INVENTION

The novel process of this invention produces surprisingly good flame retardant open-celled porous products by coating the cell walls with a flame retardant mixture even without adding flame retardants in the production of the porous mass. The present invention thus relates to utilizing flame retardant mixtures that produces carbonization masses and/or charring containing carbonization auxiliaries, reactive compounds containing phosphorus and/or boron, fillers and other auxiliary agents. These flame retardant mixtures may be optionally be utilized in the production of the open-celled porous masses. Any suitable halogenated organic flame retardant compound, with or without antimony oxides, may be used as the flame retardant agent of this invention with or without carbonization auxiliaries. The powdered halogenated organic compound, with or without phosphorus radicals, are the preferred halogenated organic compound. Halogenated organic flame retardant compounds are well known in the Arts.

DETAIL DESCRIPTION OF THE INVENTION

Open-celled porous masses may be flame retarded by the process of this invention, such as, for example, natural sponges, plastic sponges, foamed rubber and plastics. The open-celled porous masses cell walls are coated and/or reacted with flame retardant agents in a liquid, preferably water containing an adhesive agent. The flame retardant agents in the liquid consist of:
1. carbonization auxiliaries; 25 to 75 parts by weight per 100 parts by weight of liquid
2. optionally halogenated organic compounds; 0 to 75 parts by weight per 100 parts by weight of liquid
3. optionally halogenated organic phosphorus compounds; 0 to 75 parts by weight per 100 parts by weight of liquid
4. fillers; 0 to 200 parts by weight per 100 parts by weight of liquid
5. adhesives; 0 to 10 parts by weight per 100 parts by weight of liquid The liquid solution and/or suspension or emulsion of carbonization auxiliaries and/or flame retardant agents utilized in this invention are produced by adding one or more carbonization auxiliaries and/or flame retardant agents to a liquid, preferably water, to produce a solution and/or suspension or emulsion. The carbonization auxiliaries and/or flame retardant agents are added in an amount of 25 to 75 parts by weight to 100 parts by weight of the liquid. An adhesive agent is added to this liquid in the amount up to 10 parts by weight to 100 parts by weight of the liquid. Any suitable adhesive agent may be utilized such as modified starch, urea-formaldehyde resin, phenol-formaldehyde resin, furan resins, polyfurfural resin, polyfurfuryl alcohol resin, aqueous suspension of vinyl acetate, vinyl latex, polyepoxide resin, alkali metal silicates, methyl cellulose, polyacrylate resin, casein, polysulfide resin, rosin, polyimide resins, polyamide resins, polyester resins, clay, etc.

This liquid for flame retarding open-celled porous masses may contain fillers such as amino compounds, e.g., urea, melamine, dicyandiamide, and other cyanuric derivatives or their formaldehyde resins, phenol resin powder powdered synthetic resins, sawdust, carbohydrates, bituminous additives, graphite, and graphite compounds, powdered coke, alkaline metal earth silicates, metal silicates, metals and metal carbonates, oxides, sulphates, phosphates, borates and mixtures thereof.

The carbonization auxiliaries are compounds that in the presence of fire assist the formation of a carbonization foam or char such as additives that produce acidic components in the pyrolysis mixture, such as phosphorus acids, boric acid or sulfuric acids. These acidic components are compounds such, for example, acids or salts, or their derivatives of sulfur, boron and phosphorus, such as, boron-phosphates, phosphates and polyphosphates of ammonia, amines, polyamines, amino compounds and alkylanolamines, but boric acid and its salts, boron-phosphate and its salts, sulfates, elementally sulphur, phosphorus, phosphonic acids and their derivatives, organic phosphorus compounds and their salts, halogenated organic phosphorus compounds, their salts and their derivatives may also be used for this purpose. The carbonization auxiliaries and other flame retardant agent may be used in quantities of 0 to 50 percent by weight of the porous mass when utilized in the production of the porous masses. The additives may be solid or liquid. The boron-phosphate salts such as ammonium boron-phosphate, ammonium boron-polyphosphate, amino boron-phosphate and ammonium polyphosphate are particularly preferred, and amino of phosphorus acids, organic phosphorus compounds and esters of methylphosphonic acids and of phosphoric acids may also be utilized.

Flame retardant open-celled porous masses are preferably of the type produced by the reaction of:
1. polyisocyanate; 10% to 60% by weight
2. compounds with 2 or more active hydrogens and/or polyepoxides which will react with isocyanates; 25% to 70% by weight
3. carbonization auxiliaries and/or halogen flame retardant compounds; 0% to 50% by weight
4. urethane catalyst, stabilizers, emulsifiers, color components; 0% to 10% by weight
5. fillers; 0% to 200% by weight
6. blowing agents; 0% to 50% by weight Percentages are based on the weight of the polyurethane reactants. Suitable polyisocyanates for the present invention are those which are well know in polyurethane chemistry. Those polyisocyanates are for example, aliphatic, cycloaliphatic, araliphatic, aromatic and heterocyclic polyisocyanates, such as described, for example, by W. Siefken in Justus Liebigs Annalen der Chemie, 562, 75–136, particularly those of the formula:

in which,
m represents a number from 2 to 4, preferably 2.0 to 3.0, and
Q represents an aliphatic hydrocarbon radical having 2 to 18, preferably 6 to 10, C atoms, a cycloaliphatic hydrocarbon radical having 4 to 15, preferably 5 to 10, C atoms, an aromatic hydrocarbon radical having 6 to 15, preferably 6 to 13, C atoms or an araliphatic hydrocarbon radical having 8 to 15, preferably 8 to 13, C atoms are suitable.

The polyisocyanates which are readily available in the industry are preferred, for example, 2,4- and 2,6-tolulene diisocyanate and any mixtures of these isomers ("TDI"), polyisocyanates of the MDI type, for example, 4,4'- and/or 2,4'-diphenylmethane diisocyanate and/or polyphenylpolymethylene polyisocyanates, as are prepared by aniline/formaldehyde condensation and subsequent phosgenation ("crude MDI") and polyisocyanates which have carbodiimide groups, urethane groups, allophanate groups, isocyanurate groups, urea groups or biuret (modified polyisocyanates), those modified polyisocyanates which are derived from 2,4- and/or 2,6-toluylene diisocyanate or from 4,4'- and/or 2,4-diphenylmethane diisocyanate are preferred. The distillation residue having isocyanate groups which is produced during industrial production of isocyanates may be dissolved in a polyisocyanate and used in this invention. The monoisocyanates may also be used with the polyisocyanates in an amount of up to 30 percent by weight. The polyisocyanates are utilized in the amount of 10% to 60%, percentage based on weight of the polyurethane reactants.

Compounds with two or more active hydrogens may be used to react with the polyisocyanates to produce polyurethane foams, preferable open-celled rigid, semi-rigid or flexible foams. The compounds with two or more active hydrogens are, for example, polyols polyamines, polycarboxylic acids, phosphorus containing polyols, polyesters, polyethers, aldehydes, etc.

Suitable polyols which will react with polyisocyanates are those having 2 to 8 hydroxyl groups, having a molecular weight of 400 to 10,000, in particular polyesters and polyethers. Hydroxyl-containing polyesters are reaction products of polyhydric alcohols with polyhydric carboxylic acids. Suitable polyethers polyols are produced by polymerization of epoxides such as ethylene oxide, propylene oxide, butylene oxide, tetrahydrofuran, styrene oxide or epichlorohydrin with themselves or by the addition reaction of the epoxides with starting components having reactive hydrogen atoms such as water, alcohols, polyols, ammonia, or amines.

The polyols may contain phosphorus. Salts of amines containing hydroxyl groups and the various phosphorus acids, and amides of various phosphorus acids containing hydroxyl groups or NH groups may also be used. Polyols having a molecular weight of 32 to 40 may be used as chain-lengthing agents or crosslinking agents. The isocyanate active compounds that may be utilized in this invention may act as built-in carbonific, for example, as a source of carbon or intumescent foam and may contain the propellants such as nitrogen, nitrogen oxide, carbon monoxide, carbon dioxide, steam and/or other conventional propellants.

In the production of open-celled flexible polyurethane foam, the mixture to be foamed include at least one polyether polyol, at least one organic polyisocyanate, at least one blowing agent, and at least one catalyst. The mixture may also include other known additives and compounding ingredients for the preparation of polyurethane foams. Such additives include, for example, surfactants, foam stabilizers, cell openers, lubricants, microbicides, pigments, etc, The polyaxyalkylene polyether polyols are most commonly used to produce flexible foams. The polyether polyols may have dispersion of a polyurea or a polyhydrazodicarbonamide. The significant reactants in carrying out the urethane polymerization reactions are the isocyanate groups and the active hydrogen groups. The compounds with active hydrogen groups are utilized in the amount of 25% to 70% by weight, percentage based on the weight of the polyurethane reactants.

The preferred blowing agent for general use in the production of the flexible polyurethane foams is water. Other blowing agents such as certain halogen-substituted aliphatic or cyclo-aliphatic hydrocarbons having boiling points between −40 degree and +100 degree C. may also be used with or without water. These halogen-substituted hydrocarbons are usually used as the blowing agent in rigid foams with or without waters. The blowing agent us utilized in an amount up to 50% of the weight of the polyurethane reactants.

Suitable catalysts in the polyurethane foam art include tertiary amines and metallic compounds. The tertiary amines are will known in the polyurethane art. Tin compounds are particularly useful. The catalyst may be utilized in the amount up to 10% by weight of the polyurethane reactants. Surfactants, such as, organo-silicon surfactants are useful in polyurethane foam production and are utilized in an amount up to 20% of the weight of the polyurethane reactants.

The fillers that may be utilized in the flame retardant mixture are usually insoluble in the reaction mixtures to produce the open-celled masses. They may be organic substances, such as, amino compounds, such as, urea, melamine, dicyandiamide, and other cyanuric derivatives or their formaldehyde resins, phenol resin powder, powdered synthetic resins, sawdust, carbohydrates, polyhydric alcohols and their oligomers, bituminous additives, graphite and graphite compounds and powdered coke.

Inorganic fillers may be alkali metal silicates, alkaline earth metal silicates, metal silicates, metals, oxides, carbonates, sulphates, phosphates, borates, glass beads or hollow glass beads. These compounds may be either anhydrous or contain water of crystallization or split off water. Hydrated aluminum oxide is preferred. The fillers may be used in an amount of up to 200% of the weight of the polyurethane reactants.

DESCRIPTION OF PREFERRED EMBODIMENTS

My invention will be illustrated in greater detail in the specific examples which follow, which details the preferred embodiment of my process. It should be understood that the scope of my invention is not limited to the specific processes set out in the examples. Parts and percentages are by weight, unless otherwise indicated.

EXAMPLE 1

About 10 parts by weight of boric acid are mixed with 50 parts by weight of phosphoric acid then heated until a thick liquid boron-polyphosphate condensation product is formed, then 20 parts by weight of ammonium carbonate are added, mixed and reacted to produce an ammonium boron-polyphosphate condensation product. About 25 parts by weight of the ammonium boron-polyphosphate condensation product are mixed with 100 part by weight of water, then a 4"×8"×8" piece of open-celled polyurethane flexible foam, which was produced from polyether triol and TDI without flame retardants, is compressed and then placed in the said aqueous emulsion. The foam expands and vacuum the emulsion into the cells. The foam is then compressed to remove the excess aqueous emulsion and then air dried.

The dried flame retardant foam is weighed then flame tested (California TB133) by placing a 100 gms wood crib on the foam. The wood crib is burned and the foam is re-weighed. There was a 52 gms weight loss. The flames did not travel. There was less smoke produced.

EXAMPLE 2

Example 1 was modified by using a flexible, open-celled, polyurethane foam produced by using MDI and polyether triol without flame retardants in place of the TDI foam. After the 100 gms of wood burned on the foam there was a weight loss of 45 gms.

EXAMPLE 3

Example 1 was modified wherein a flexible, open-celled polyurethane foam produced using polymeric MDI and polyether triol without flame retardants was used in place of the TDI foam. After the 100 gms of wood burned on the foam there was a 49 gms weight loss.

EXAMPLE 4

Example 1 was modified wherein another compound is used in place of ammonium carbonate and selected from the list below:

| | | |
|---|---|---|
| a) | ammonium phosphate |
| b) | ammonium borate |
| c) | melamine |
| d) | urea |
| e) | guanidine |
| f) | dicyandiamide |
| g) | ethyl urea |
| h) | ethylamine |
| I) | thiourea |
| j) | diethylenediamine |
| k) | ethylenediamine |
| l) | ammonia |
| m) | ammonium molybdate |
| n) | mixtures of the above |

EXAMPLE 5

Example 1 was modified wherein another open-celled porous mass was used in place of the polyurethane flexible foam and selected from the list below:

a) natural sponge
b) cellulose sponge
c) foamed rubber latex
d) foamed flexible polyepoxy plastic
e) foamed flexible polyester plastic
f) foamed phenol-formaldehyde plastic
g) foamed urea-formaldehyde plastic
h) open-celled semi-rigid polyurethane foam
i) open-celled rigid polyurethane foam
j) foamed poly(methyl methylacrylate) plastic
k) foamed poly(vinyl chloride) plastic
l) foamed polystyrene plastic
m) foamed butadiene-styrene plastic
n) foamed polychloroprene plastic
o) foamed polyisoprene plastic
p) foamed poly(butadiene-acrylonitrile) plastic
q) foamed polyethylene plastic
r) foamed poly(vinyl acetate) plastic
s) foamed poly(ethylene-vinyl) plastic.

EXAMPLE 6

Example 1 was modified wherein 10 parts by weight of a powdered metal containing compound are added to the aqueous emulsion of ammonium boron-polyphosphate condensation product and selected from the list below:

| | | |
|---|---|---|
| a) | magnesium oxide |
| b) | magnesium chloride |
| c) | talcum |
| d) | antimony trioxide |
| e) | zinc oxide |
| f) | zinc borate |
| g) | alumina trihydrate |
| h) | alumina magnesium calcium silicate |
| i) | sodium silicate |
| j) | zeolite |
| k) | magnesium hydroxide |
| l) | sodium carbonate |
| m) | calcium carbonate |
| n) | ammonium molybdate |
| o) | iron oxide |
| p) | copper oxide |
| q) | zinc phosphate |
| r) | zinc chloride |
| s) | clay |
| t) | sodium dihydrogen phosphate |
| u) | tin |
| v) | molybdenum |

-continued w) zinc
x) and mixtures of the above

EXAMPLE 7

Example 1 is modified wherein and adhesive in the amount of 5 parts by weight are added to the aqueous emulsion of ammonium boron-polyphosphate condensation product and selected from the list below:

a) modified starch
b) urea-formaldehyde resin
c) phenol-formaldehyde resin
d) aqueous suspension of vinyl acetate
e) flexible polyepoxy resin
f) flexible polyepoxy resin
g) polyamide resin
h) aqueous polyurethane resin
i) polyvinyl alcohol
j) melamine-formaldehyde resin
l) resorcinol resin
m) sodium silicate
n) methyl cellulose
o) polyacrylate resin
p) casein
q) polysulfide resin
r) polymethacrylate
s) and mixtures of the above

EXAMPLE 8

110 gms of a ethylene oxide modified polypropylene triol (Miles' Multranol 7057), 3 gms of water, 1 gm silicone surfactant (Union Carbide's L6020), 0.25 gm amine catalyst (Air Products' Dabco R8020) and 0.1 gm of tin catalyst (Air Products' T12) are mixed then mixed with 50 gms of TDI (Miles' Mondur TDI). The mixture expands and cures into an open-celled flexible foam of about 1.5 lbs/cu.ft. The flexible foam is cured for 1 week.

The cured flexible foam is compressed and placed into an aqueous emulsion containing 20% ammonium polyphosphate and 20% melamine phosphate. The aqueous emulsion is vacuumed into the open cells. The foam is removed from the aqueous emulsion then compressed to remove the excess fluids. The foam is then air dried. After the foam has dried it is weighed then tested (California TB 133) by burning 100 gms of wood on top of the foam. After the wood has burned and charcoals removed the foam is weighed. There was a 49 gms weight loss. The flame did not spread and there was a decrease in the amount of smoke.

EXAMPLE 9

Example 8 is modified wherein 10 parts by weight of a powdered filler is added to the polyol and selected from the list below:

a) wood powder
b) expandable graphite
c) phenol-formaldehyde resin
d) urea-formaldehyde resin
e) melamine
f) urea
g) dicyandiamide
h) carbohydrate
i) coke
j) melamine-formaldehyde resin
k) fuel ash
l) glass beads
m) silicate beads
n) ammonium borate
o) gypsum
p) mica
q) chalk
r) apatite
s) aluminum hydroxide
t) calcium borate
u) aluminum silicate hollow beads
v) boron oxide
w) magnesium phosphate
x) and mixtures of the above

EXAMPLE 10

Example 8 is modified wherein 15 parts by weight of a flame retardant compound is added to the polyol in place of dimethyl methyl phosphonate and selected from the list below:

a) ammonium polyphosphate
b) urea phosphate
c) melamine pyrophosphate
d) melamine salt of boron-polyphosphate
e) ammonium salt of boron-polyphosphate
f) melamine orthophosphate
g) ammonium urea phosphate
h) ammonium melamine phosphate
i) urea salt of dimethyl methyl phosphonate
j) melamine salt of dimethyl methyl phosphonate
k) melamine salt of dimethyl hydrogen phosphite
l) brominated epoxy oligmer
m) polypentabromobenzyl acrylate
n) decabromodiphenyl oxide
o) pentabromodiphenyl oxide
p) 2,3-dibromopropanol
q) octabromodiphenyl oxide
r) tris(2-chloroethyl) phosphite
s) diethyl phosphite
t) tris(dichlorobropropyl) phosphite
u) dicyandiamide pyrophosphate
v) triphenyl phosphite
w) ammonium dimethyl phosphate
x) and mixtures of the above

EXAMPLE 11

Example 8 is modified wherein a flame retardant compound is utilized in place of ammonium polyphosphate in the aqueous emulsion and selected from the list below:

a) urea
b) melamine
c) cyanoquanidine
d) ethylenediamine salt of phosphonic acid
e) ethanolamine dimethyl phosphate
f) ammonium carbonate
g) diammonium phosphate
h) urea-formaldehyde resin
i) ammonium urea polyphosphate
j) boric acid
k) thiourea
l) diethylenediamine polyphosphate
m) dicyandiamide polyphosphate
n) ethyl urea
o) melamine formaldehyde resin
p) methylamine boron-phosphate
q) potassium ammonium phosphate -continued r) ammonium silicate
s) quaternary ammonium hydroxide
t) aniline phosphate
u) ammonium oxalate
v) ammonium borate
w) cyanuramide phosphate
x) mixtures of the above

EXAMPLE 12

Example 8 is modified wherein another polyisocyanate is used in place of TDI and selected from the list below:
a) 55 gms of diphenylmethane-4,4'-diisocyanate (MDI)
b) 60 gms of polymeric MDI (Mondur MR by Miles)
c) 55 gms of modified polymeric polyisocyanate (Mondur E-448 by Miles)
d) 55 gms of Mondur T-422 by Miles
e) 60 gms polymeric MDI (PAPI 27 by DOW)

EXAMPLE 13

Example 8 is modified wherein another polyol is used in place of Multranol 7057 and selected from the list below:
a) 50% multranol 7057 and 50% multranol 3900 by Miles
b) Polyol-G 3056 by Olin
c) polyol L56 by ARCO
d) 25% Polybid liquid resin and 75% polyol L56 by ARCO
e) 25% Poly-G 55-173 and 75% Poly-G 32-56 by Olin
f) propylene oxide/ethylene oxide adduct having a hydroxyl No. 56 and contains 9% ethylene oxide
g) propylene oxide adduct of trimethylol propane having a hydroxyl No. 56

EXAMPLE 14

Example 8 is modified wherein another flame retardant compound is used in place of ammonium polyphosphate and melamine phosphate in the aqueous emulsion and selected from the list below:
a) 15% urea borate and 15% ammonium boron-polyphosphate
b) 15% urea phosphate, 20% ammonium polyphosphate and 3% polyvinyl chloride latex
c) 10% boric acid and 20% melamine
d) 20% ammonium boron-polyphosphoric, 10% decabromodiphenyl oxide, 5% antimony trioxide
e) 20% urea borate, 20% dimelamine phosphate and 3% clay
f) 30% magnesium and ammonium salt of boron-polyphosphoric acid and 3% starch
g) 10% boron oxide, 10% melamine phosphate and 10% ammonium polyphosphate
h) 20% ammonium salt of boron-polyphosphoric acid and 10% talcum powder
i) 10% ammonium polyphosphate, 10% melamine phosphate, 10% alumina hydrate and 5% phenol-formaldehyde resin
j) 10% boric acid, 10% hydrated sodium silicates powder and 10% ammonium polyphosphorate
k) 10% melamine, 10% boric acid and 10% sodium silicate powder
l) 10% zinc phosphate powder, 10% boron oxide powder, 10% melamine and 5% magnesium hydroxide
m) 5% zinc chloride, 10% ammonium boron-phosphorate, 10% melamine phosphate and 3% polylacrylic acid emulsion
n) 5% zeolite powder, 10% ammonium urea phosphate, 5% ammonium molybdate and 3% polyvinyl acetate emulsion
o) 5% ammonium sulfate, 10% dicyandiamide, 5% urea phosphate and 5% urea-formaldehyde resin
p) 10% ethylenediamine phosphorate, 5% melamine-formaldehyde resin, 5% boric acid, 5% melamine polyphosphorate and 3% polyamide resin
q) 25% magnesium ammonium boron-phosphate and 3% flexible polyepoxy resin
r) 20% ammonium melamine phosphate, 5% ammonium polyphosphate and 3% polymethylacrylate
s) 20% melamine salt of dimethyl methyl phosphonate and 5% melamine-formaldehyde resin The following abbreviations are employed in the following examples:

Polyol A is a propylene oxide/ethylene oxide adduct having a hydroxyl number of 56 and containing 9% ethylene oxide.

Polyol B is a propylene oxide/ethylene oxide of glycerine having a hydroxyl number of 35 and containing 16.5% ethylene oxide.

Polyol C is a propylene oxide adduct of trimethylolpropane having a hydroxyl number of 29 and containing 15% ethylene oxide.

Polyol D is a propylene oxide adduct of trimethyolpropane having a hydroxyl number of 56.

T12 is dibutyltin dilaurate.
DMEA is dimethylethanolamine.
Dabco 33lv is a 33% solution of triethylenediamine in dipropylene glycol.
Silicon L6020 is a silicone surfactant manufactured by Union Carbide.
Silicon L5420 is a silicone surfactant manufactured by Union Carbide.
Niax A1 is an amine catalyst manufactured by Union Carbide.
TDI is toluene diisocyanate (Mondur TDI by Miles).
Mondur MR is a polymeric MDI manufactured by Miles.
DE6OF is pentabromodiphenyl oxide.
DMMP is dimethyl methyl phosphonate
Mel is melamine
Mel phos is melamine phosphate
Mel-DMMP is melamine salt of dimethyl methyl phosphonate urea phos is urea phosphate
APP is ammonium polyphosphate boron-phos is boron-phosphate condensation product
MgO is magnesium oxide
FR is the flame retardant in the aqueous solution for after treatment to the foam.

Examples 15–25 was prepared by the following procedures:

Component A, is composed of the polyol, water, silicone surfactant, Freon 11, catalyst, DMEA, filler and flame retardant. The mixture was agitated on a mixing machine for 30 minutes, in the proportions listed in grams.

Component B, composed of a polyisocyanate in the proportions listed in grams.

Components A and B were mixed for 10 seconds then poured into a plastic mold. The foams were cured for 1 week then the open-celled foam was compressed and placed in an aqueous solution and/or emulsion containing 40% flame retardant. The foam was then expanded and the aqueous emulsion was vacuumed into the cells. The foam was then compressed to remove the excess aqueous emulsion then air dried.

TABLE I

| Formulation | \multicolumn{6}{c}{Examples} | | | | | |
|---|---|---|---|---|---|---|
| | 15 | 16 | 17 | 18 | 19 | 20 |
| Polyol A | 200 | 100 | 50 | 25 | 125 | |
| Polyol B | | 100 | 150 | 175 | 75 | 200 |
| Water | 8.0 | 7.0 | 9.0 | 6.0 | 8.0 | 7.0 |
| L6020 | 2.0 | 2.0 | 2.0 | 2.0 | 2.0 | 2.0 |
| Dabco 33LV | 0.4 | 0.5 | 0.4 | 0.4 | 0.4 | 0.4 |
| T12 | 0.5 | 0.5 | 0.5 | 0.5 | 0.5 | 0.5 |
| DMMP | 15 | 20 | 15 | 10 | 18 | 20 |
| TDI | 110 | 100 | 95 | 35 | | 90 |
| Polymeric MDI | | | | 65 | 130 | |
| Density PCF | 1.5 | 1.6 | 1.7 | 1.7 | 1.5 | 1.8 |
| FR | | | | | | |
| mel phos | 30% | | 20% | | | |
| mel | | 15% | | | 10% | |
| boric acid | 10% | 5% | | 10% | | |
| boron-phos | | | 10% | | 20% | 20% |
| APP | | 20% | 10% | 10% | 10% | 20% |
| urea phos | | | | 20% | | |
| Flame testing | | | | | | |
| Calif. TB 133 weight loss | 52 gms | 49 gms | 48 gms | 45 gms | 35 gms | 52 gms |

TABLE II

| Formulation | \multicolumn{5}{c}{Examples} | | | | |
|---|---|---|---|---|---|
| | 21 | 22 | 23 | 24 | 25 |
| Polyol C | 150 | | 150 | 50 | 100 |
| Polyol D | 50 | 200 | 50 | 150 | 100 |
| water | 7.5 | 8.0 | 8.5 | 8.0 | 9.0 |
| silicone L6020 | 2.0 | 2.0 | 2.0 | 2.0 | 2.0 |
| Dabco 33LV | 0.4 | 0.2 | 0.4 | 0.4 | 0.4 |
| Niax A1 | | 0.2 | 0.1 | | 0.1 |
| DMEA | 0.8 | 0.4 | 0.6 | 0.5 | 0.8 |
| TDI | 100 | | 50 | | 60 |
| Polymeric MDI | | 130 | 65 | 130 | 50 |
| Mel | 5 | | | 5 | |
| AlOH | | | | 5 | |
| APP | 15 | | | 10 | 5 |
| Mel-phos | | | | | 5 |
| DMMP | 5 | | | | |
| DE60F | | | 10 | 10 | |
| Mel-DMMP | | 25 | 20 | | 10 |
| Boron-phos | 5 | | | | 5 |
| Density PCF | 1.7 | 1.5 | 1.8 | 1.6 | 1.7 |
| FR | | | | | |
| APP | 25 | 5 | | | 15 |
| Boron-phos | | 10 | 25 | | 15 |
| boric acid | 5 | 5 | | | |
| mel | | | 10 | | |
| urea phos | 10 | | | 10 | 5 |
| MgO | | 5 | 5 | 5 | 5 |
| mel phos | | | | 25 | |
| Flame testing (California TB 133) | | | | | |
| wt, loss | 52 gms | 32 gms | 48 gms | 54 gms | 45 gms |

I claim:

1. A flame retardant open-celled porous organic mass produced by coating the wall of the open-cells of a more flammable formed porous organic mass with one or more carbonization auxiliaries selected from the group consisting of an acid, salt or a derivative of an acid or salt of sulfur, boron or phosphorus or mixtures thereof, one or more fillers selected from the group consisting of magnesium oxide or hydroxide, aluminum hydroxide, talcum, chalk, dolomite, mica, apatite, kaolin, alkali metal silicate, hollow silicate beads, glass beads fuel ash, powdered synthetic resins, phenol resins powder, bituminous additives, melamine, urea, urea derivatives, dicyandiamide, carbohydrates, sawdust, antimony oxides, expandable graphite and mixtures thereof, flame retardant agents and an adhesive agent.

2. A flame retardant open-celled porous organic mass according to claim 1, wherein said carbonization auxiliary is a phosphate or polyphosphate and/or boron-phosphate condensation product of ammonia, melamine, urea, ethylene diamine, alkylanolamine or boric acids and its salts, sulphates, elementary phosphorus, phosphonic acid and phosphoric acids and mixtures thereof.

3. A flame retardant open-celled porous organic mass of claim 1 wherein the adhesive agent is selected from starch, starch derivatives, rubber latex, vinyl latex, polyepoxy resins, polyamide resins, polyester resins, polyurethane resins, polyacrylate resins, polyacrylonitrile, animal glue, aminoplasts, phenoplasts, furan resins, alkali metal silicates, methyl cellulose, casein, polysulfide resins, methyl cellulose, aqueous suspension of vinyl acetate,clay, rosin and mixtures thereof; in the amount of 0 to 10 parts by weight in 100 parts by weight of water or the flame retardant coating liquid.

4. A flame retardant open-celled porous mass according to claim 1, wherein said formed open-porous organic mass is selected from the group consisting of foamed plastics, foamed rubber, natural sponges, plastic sponges, cellulose sponges and foamed rubber.

5. A flame retardant open-celled porous organic mass according to claim 1, wherein flame retardant agents are selected from the group consisting of halogenated organic compounds and halogenated organic phosphorus containing compounds; added in the amount of 0 to 75 parts by weight per 100 parts by weight of coating liquid.

6. A flame retardant open-celled polyurethane porous mass produced by reacting a polyisocyanate with an isocyanate reactive compound in the presence of a urethane catalyst, blowing agent, surface active agent and other auxiliary agents, thereby producing a flammable open-celled polyurethane mass, then coating the porous open-celled walls of the said flammable polyurethane foam with an aqueous solution and/or emulsion or suspension of carbonization auxiliaries selected from the group consisting of an acid, salt or a derivative of an acid or salt of sulfur, boron, phosphorus or mixtures thereof, and/or flame retardant agents, fillers selected from the group consisting of magnesium oxide or hydroxide, aluminum hydroxide, talcum, chalk, dolomite, mica, apatite, kaolin, alkali metal silicate, hollow silicate beads, glass beads, fuel ash, powdered synthetic resins, phenol resin powder, bituminous additives, melamine, urea, urea derivatives, dicyandiamide, carbohydrates, sawdust, antimony oxides, expandable graphite and mixtures thereof, adhesive agents, then drying out the water.

7. A flame retardant open-celled polyurethane porous mass of claim 6, wherein the carbonization auxiliaries are ammonium salt of a boron-polyphosphate condensation product.

8. A flame retardant open-celled polyurethane porous mass of claim 6, wherein the carbonization auxiliaries are a mixture of ammonium polyphosphate and boron oxide and/ or boric acid.

9. The process for the production of a flame retardant open-celled organic mass by the following steps:

a) adding and mixing 25 to 75 parts by weight of a carbonization agent selected from the group consisting of an acid, salt or a derivative of an acid or salt of sulfur, boron, phosphorus or mixtures thereof, 0 to 75 parts by weight of an halogenated organic compound and/or halogenated organic phosphorus compound, 0 to 200 parts by weight of a filler and 0 to 10 parts by weight of an adhesive per 100 parts by weight of a liquid;

b) placing the open-celled organic porous mass in the said liquid mixture then compress the flexible porous masses and vacuum said liquid mixture into the cells; the rigid open-celled porous mass is submerged until the liquid mixture fill the open-cells;

c) the excess liquid mixture is removed from the flexible mass by compressing the said mass and removed from the rigid mass by draining;

d) the said mass is then dried.

10. The process of claim 9 wherein the carbonization auxiliary is a phosphate or polyphosphate and/or boron-phosphate condensation product of ammonia, melamine, urea, ethylene diamine, alkylanolamine or boric acid and its salts, sulphates, elementary phosphorus, phosphonic acid and phosphoric acids, and mixtures thereof.

11. The process of claim 9 wherein the filler is selected from the group consisting of magnesium oxide or hydroxide, aluminum hydroxide, talcum, chalk, dolomite, mica, apatite, kaolin, alkali metal silicates, hollow silicate beads, glass beads, fuel ash, powdered synthetic resins, graphite, powdered coke, phenol resin powder, bituminous additives, melamine, urea, urea derivatives, dicyandiamide, carbohydrates, sawdust, antimony oxides, expandable graphite and mixtures thereof.

12. The process of claim 9 wherein the adhesive is selected from the group consisting of starch, starch derivatives, rubber latex, vinyl latex, polyepoxy resins, polyamide resins, polyester resins, polyurethane resins, polyacrylate resins, polyacrylonitrile, animal glue, aminoplasts, phenoplasts, furan resins, alkali metal silicates, methyl cellulose, casein, polysulfide resins, aqueous suspension of vinyl acetate, clay, rosin and mixtures thereof; in the amount of 0 to 10 parts by weight per 100 parts by weight of said liquid.

13. A flame retardant open-celled porous polyurethane mass of claim 9, wherein the isocyanate reactive compound is selected from the group consisting of polyoxy-alkylene polyether polyols, polyester polyols, polyether polyols modified with acrylonitrile and/or styrene, polyol containing phosphorus and mixtures thereof.

* * * * *